(12) United States Patent
Huang et al.

(10) Patent No.: US 11,211,829 B2
(45) Date of Patent: Dec. 28, 2021

(54) SYSTEMS AND METHODS FOR OPERATION EFFICIENCY IN WIRELESS POWER TRANSFER

(71) Applicant: Integrated Device Technology, Inc., San Jose, CA (US)

(72) Inventors: Jiangjian Huang, San Jose, CA (US); Feng Zhou, San Jose, CA (US); Zhitong Guo, San Jose, CA (US); Rui Liu, Fremont, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 14 days.

(21) Appl. No.: 16/371,887

(22) Filed: Apr. 1, 2019

(65) Prior Publication Data
US 2020/0212719 A1   Jul. 2, 2020

Related U.S. Application Data

(60) Provisional application No. 62/787,030, filed on Dec. 31, 2018.

(51) Int. Cl.
*H01F 27/42* (2006.01)
*H01F 37/00* (2006.01)
(Continued)

(52) U.S. Cl.
CPC .............. *H02J 50/27* (2016.02); *H02J 50/10* (2016.02); *H02J 50/23* (2016.02)

(58) Field of Classification Search
CPC .. H02J 50/27; H02J 50/10; H02J 50/23; H02J 50/90; H02J 7/00036; H02J 7/007192; H02J 7/007
(Continued)

(56) References Cited

U.S. PATENT DOCUMENTS

| 10,644,531 B1 * | 5/2020 | Qiu ........................ H02J 7/045 |
| 2015/0236518 A1 * | 8/2015 | Matsumoto ............ H02J 7/025 307/104 |

(Continued)

FOREIGN PATENT DOCUMENTS

| KR | 10-2017-0018454 | 2/2017 |
| KR | 10-2017-0122246 | 11/2017 |

OTHER PUBLICATIONS

European Search Report, dated Mar. 31, 2020, from European Application No. 19211875.0, pp. 1-8.
(Continued)

*Primary Examiner* — Richard Tan
(74) *Attorney, Agent, or Firm* — Haynes and Boone, LLP

(57) ABSTRACT

Embodiments described herein a method for controlling operating frequency for a wireless power charging system. Specifically, a transmitter coil at a wireless power transmitter is driven under an operating frequency and an input voltage. Deadtime information at the wireless power receiver is received, from a wireless power receiver having a receiver coil that receives wireless power from the transmitter coil. A microcontroller then determines, based on the received deadtime information or the operating frequency, whether the operating frequency deviates from a target operating frequency range. Based on the determination, one or both of the operating frequency or the input voltage are adjusted thereby causing the operating frequency to fall within the target operating frequency range.

18 Claims, 8 Drawing Sheets

(51) Int. Cl.
  *H01F 38/00*    (2006.01)
  *H02J 50/27*    (2016.01)
  *H02J 50/10*    (2016.01)
  *H02J 50/23*    (2016.01)

(58) Field of Classification Search
  USPC ........................................................ 307/104
  See application file for complete search history.

(56) References Cited

U.S. PATENT DOCUMENTS

| | | | |
|---|---|---|---|
| 2016/0064951 A1* | 3/2016 | Yamamoto | H02J 7/025 307/104 |
| 2016/0079797 A1* | 3/2016 | Jeong | H02J 50/10 320/108 |
| 2016/0218520 A1 | 7/2016 | Mehas et al. | |
| 2016/0309418 A1 | 10/2016 | Sedzin et al. | |
| 2016/0344241 A1* | 11/2016 | Hong | H02J 7/00045 |
| 2017/0163100 A1 | 6/2017 | Vocke et al. | |
| 2017/0366048 A1 | 12/2017 | Watanabe et al. | |

OTHER PUBLICATIONS

Office Action dated Jan. 11, 2021 issued in related Korean Patent Application No. 10-2019-0154694 (7 pages).

\* cited by examiner

SYSTEMS AND METHODS FOR OPERATION EFFICIENCY IN WIRELESS POWER TRANSFER

CROSS-REFERENCE

This application claims the benefit, under 35 U.S.C. § 119(e), of commonly-owned U.S. provisional application No. 62/787,030, filed on Dec. 31, 2018, which is hereby expressly incorporated herein by reference.

TECHNICAL FIELD

Embodiments of the present invention are related to wireless transmission of power and, in particular, to provide an algorithm for the efficient transfer of wireless power.

DISCUSSION

Mobile devices, for example smart phones, tablets, wearables and other devices are increasingly using wireless power charging systems. In general, wireless power transfer involves a transmitter driving a transmitter coil and a receiver with a receiver coil placed proximate to the transmitter coil. The receiver coil receives the wireless power generated by the transmitter coil and uses that received power to drive a load, for example to provide power to a battery charger. when transmission power is increased to achieve a high transferred power at the receiver, the wireless charging system can be sensitive to the operating frequency of the transmitter. Specifically, when the wireless charging system is not operated at a desired frequency or input voltage, the transmission power at the transmitter can sometimes be raised to an unwanted high level. Consequently, device performance of the transmitter can be compromised due to the elevated device temperature.

Therefore, there is a need to develop systems for efficient transmission of wireless power.

SUMMARY

In view of the wireless power transfer efficiency issues, embodiments described herein a method for controlling operating frequency for a wireless power transfer system. Specifically, a transmitter coil at a wireless power transmitter is driven under an operating frequency and an input voltage. Deadtime information is received at the wireless power receiver from a wireless power receiver having a receiver coil that receives wireless power from the transmitter coil. A microcontroller then determines, based on the received deadtime information or the operating frequency, whether the operating frequency deviates from a target operating frequency range. Based on the determination, one or both of the operating frequency or the input voltage are adjusted thereby causing the operating frequency to fall within the target operating frequency range.

Embodiments described herein further provide a device for controlling operating frequency for a wireless power charging system. The device includes a memory, a transmitter coil driven under an operating frequency and an input voltage, a communication interface and a controller. The communication device is configured to receive, from a wireless power receiver having a receiver coil that receives wireless power from the transmitter coil, deadtime information at the wireless power receiver. The controller is configured to determine, based on the received deadtime information or the operating frequency, whether the operating frequency deviates from a target operating frequency range, and adjust one or both of the operating frequency or the input voltage thereby causing the operating frequency to fall within the target operating frequency range.

These and other embodiments are discussed below with respect to the following figures.

These diagrams are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Figure 1:
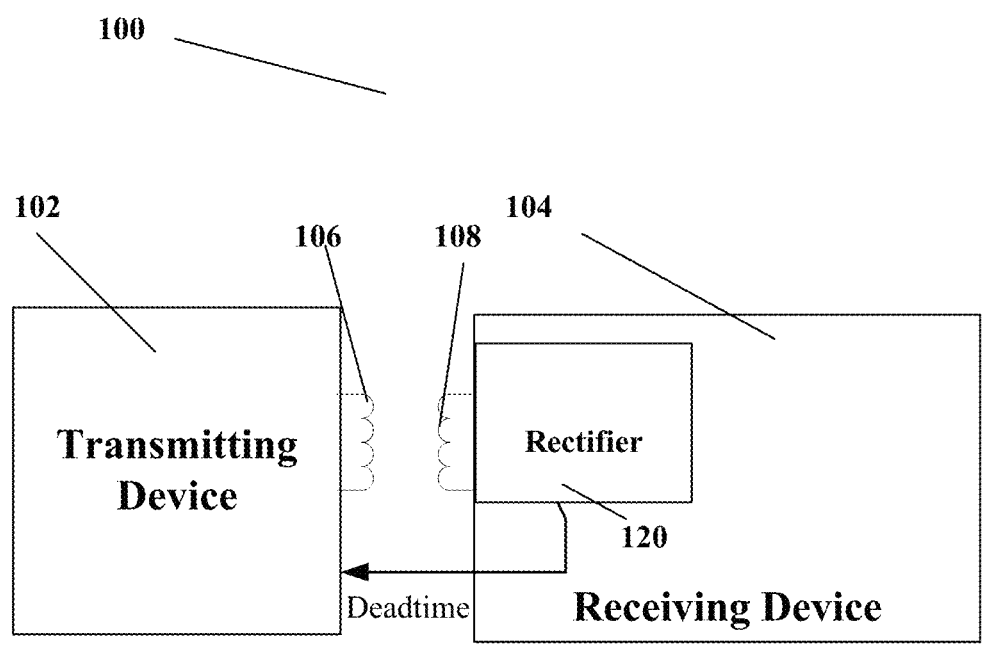
FIG. 1 illustrates an example wireless power system having a deadtime feedback path from the receiving device to the transmitting device for power transfer efficiency control, according to some embodiments.

FIG. 1 illustrates an example wireless power system 100 having a deadtime feedback path from the receiving device to the transmitting device for power transfer efficiency control, according to some embodiments. As illustrated in FIG. 1, a transmitting device 102 transfers wireless power to a receiving device 104. Transmitting device 102 is coupled to a transmitter coil 106, which generates a time-varying electromagnetic field. In this way, the transmitter coil 106 transfers power to the receiver coil 108 coupled to the receiving device 104 via electromagnetic induction.

The receiver coil 108 is coupled to the receiving device 104. A rectifier circuit 120 within the receiving device 104 receives and rectifies wireless power received at the receiver coil 108, and then in turn provides a direct current (DC) output voltage for battery charging.

At times, when the wireless power system 100 may not be operated at the best efficiency mode, thus the transmitter power may be elevated that leads to a high temperature, which would compromise the device performance. Specifically, the efficient operating frequency can be defined as the operating frequency that minimizes the root mean square (RMS) value of all currents and voltages at the transmitting device 102 for the same receiver output power at the receiving device 104. The efficient operating frequency is usually influenced by characteristics of the transmitter coil 106 and/or the receiver coil 108, such as the type, length, material of the coils, loading condition, gap space, and/or the like. In some embodiments, the efficient operating frequency for a particular pair of transmitter coil 106 and receiver coil 108 may be defined as the target operating frequency to operate the wireless power transfer system 100. A target operating frequency range is defined as a frequency range centered around the target operating frequency, e.g., ±10 KHz, ±5 KHz, etc.

Figure 2A:
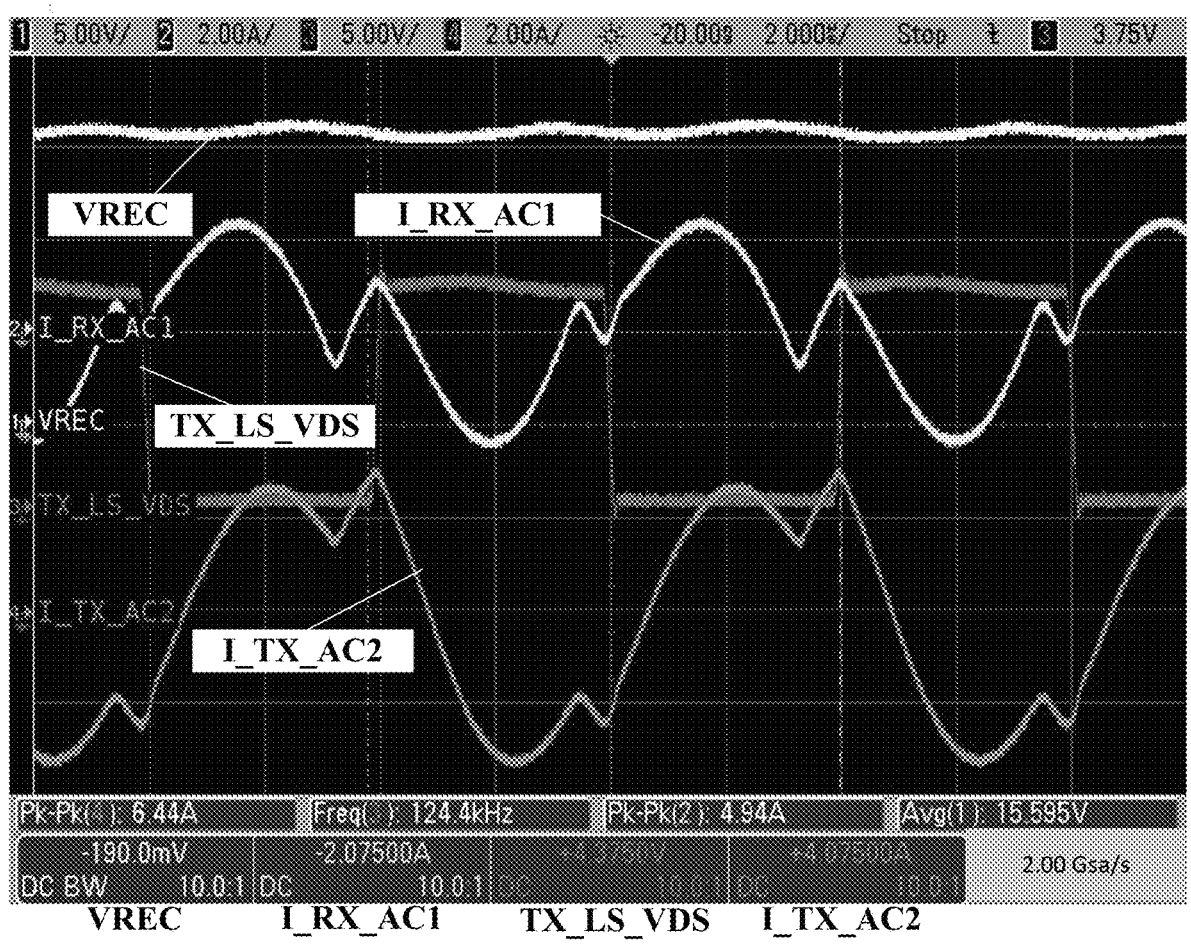
FIGS. 2A-2C illustrate various operating modes of the example wireless power transfer system 100 shown in FIG. 1.
Figure 2B:
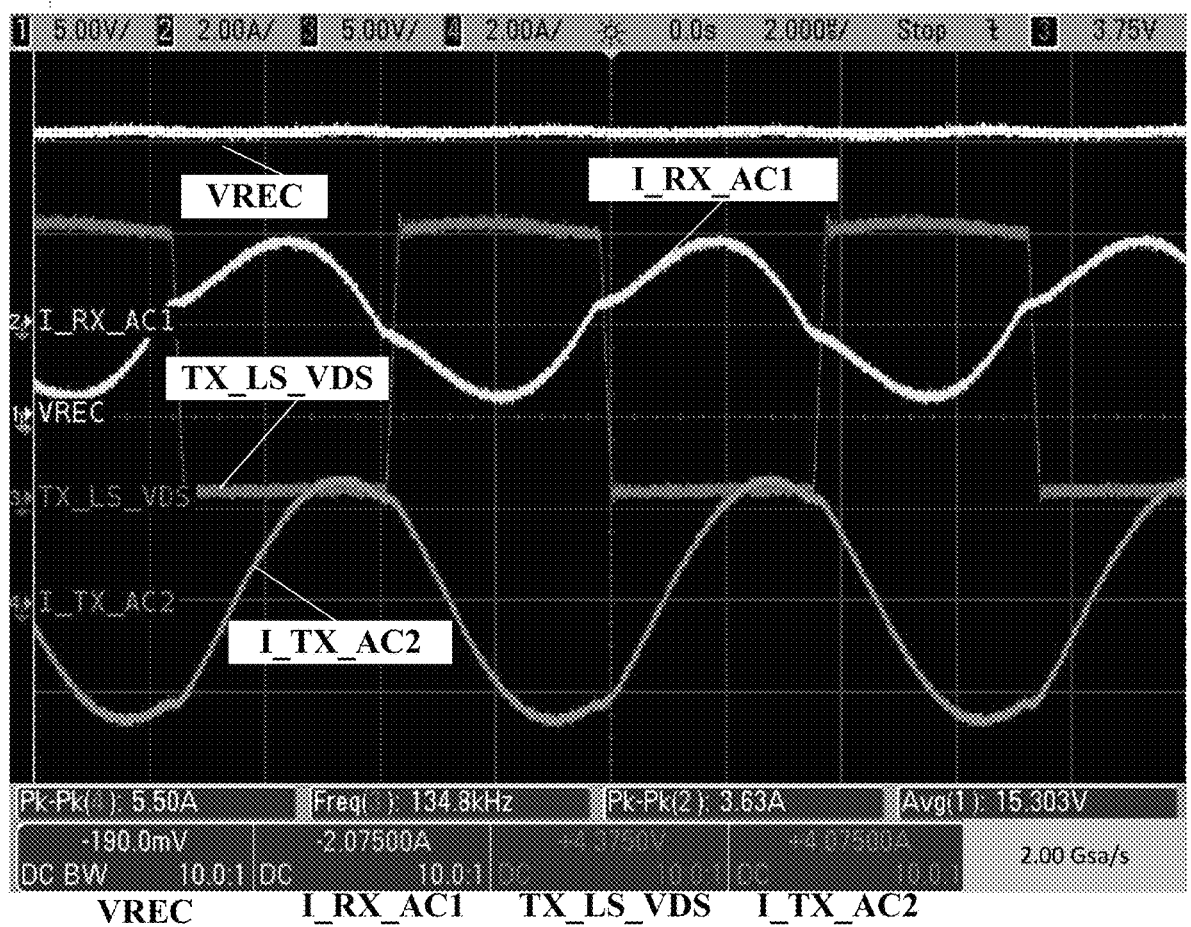
Figure 2C:
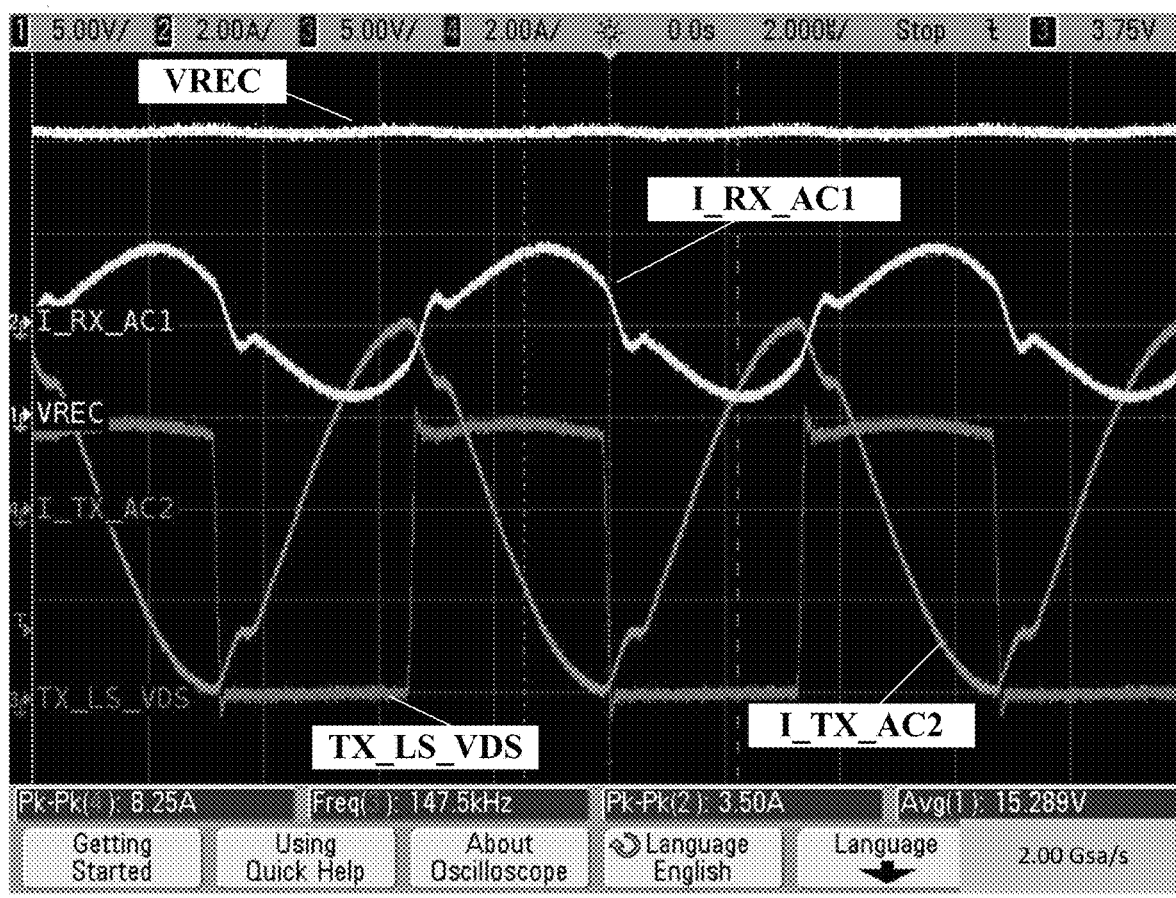

For example, FIGS. 2A-2C illustrate various operating modes of the example wireless power transfer system 100 shown in FIG. 1. In FIGS. 2A-2C, the signal plot I_TX_AC2 represents an AC current passing through transmitter coil 106 to create an electromagnetic field the signal plot I_RX_AC1 represents an AC current received at receiver coil 108 via electromagnetic induction. TX_LS_VDS represents the AC voltage at the transmitter coil 106. In FIG. 2A, when the operating frequency is at 124 kHz, significant signal oscillation exists during the deadtime of the receiving device 104, e.g. the transient time for I_RX_AC1 to transit from high to low or from low to high, which leads to significant power waste during the deadtime. For example, deadtime is shown at segment 402 in FIG. 4, which provides a detailed view of the AC voltage or current. Thus, the operating frequency of 124 KHz may not be the efficient operating frequency. For another example, in FIG. 2B, when the operating frequency is at 135 kHz, signal oscillation during deadtime is at the minimum. In FIG. 2C, when the operating frequency is raised to 147 KHz, significant signal oscillation during deadtime is observed again. Thus, the operating frequency of 135 KHz can be substantially similar to the best operating frequency that minimize the RMS of all the currents and voltages for the same receiver output power.

Thus, there is a need to operate the wireless power transfer system at the optimal frequency, e.g., at 135 KHz in the respective example, or within an acceptable range around 135 KHz. Conventionally, to tune or maintain the wireless power transfer system 100 within the target operating frequency range, a frequency control or voltage control method is employed to avoid over-powering of the wireless transmitting device 102. For example, for the conventional frequency control method, the input voltage to the transmitter 106 is fixed at a constant value, and the operating frequency of the wireless power transfer system 100 is adjusted to achieve better power transfer efficiency. In this case, the efficiency of the wireless power transfer may not reach the optimum because when the coil gain of transmitter coil 106 is small, the operating frequency is usually much lower than the optimized operating frequency for the best power transfer efficiency; or when the coil gain is high, the operating frequency hits the upper limit of the permitted operating frequency range and the power transfer system needs to be operated under pulse width modulation (PWM) control, resulting in less power transfer efficiency.

In another example, due to restrictions on frequency contents, the conventional voltage control method can be used by fixing the operating frequency and varying the input voltage to a DC/AC converter in the wireless power transmitter 106 to control the power transfer level. In this case, the power transfer efficiency can still be limited because the operating frequency may not match the frequency that provides the best power transfer efficiency (e.g., minimum RMS of currents and voltages at 102) for a particular power transfer system. In addition, the available input voltage arrange may not meet the maximum power requirement for operating at the best efficiency mode.

In view of the constraints of the conventional methods, embodiments described herein provide an adaptive control mechanism to adjust the combination of the input voltage to the transmitting device 102, or the operating frequency, by monitoring feedback information of the deadtime at the receiving device 104, as further illustrated in FIGS. 3-6.

Figure 3:
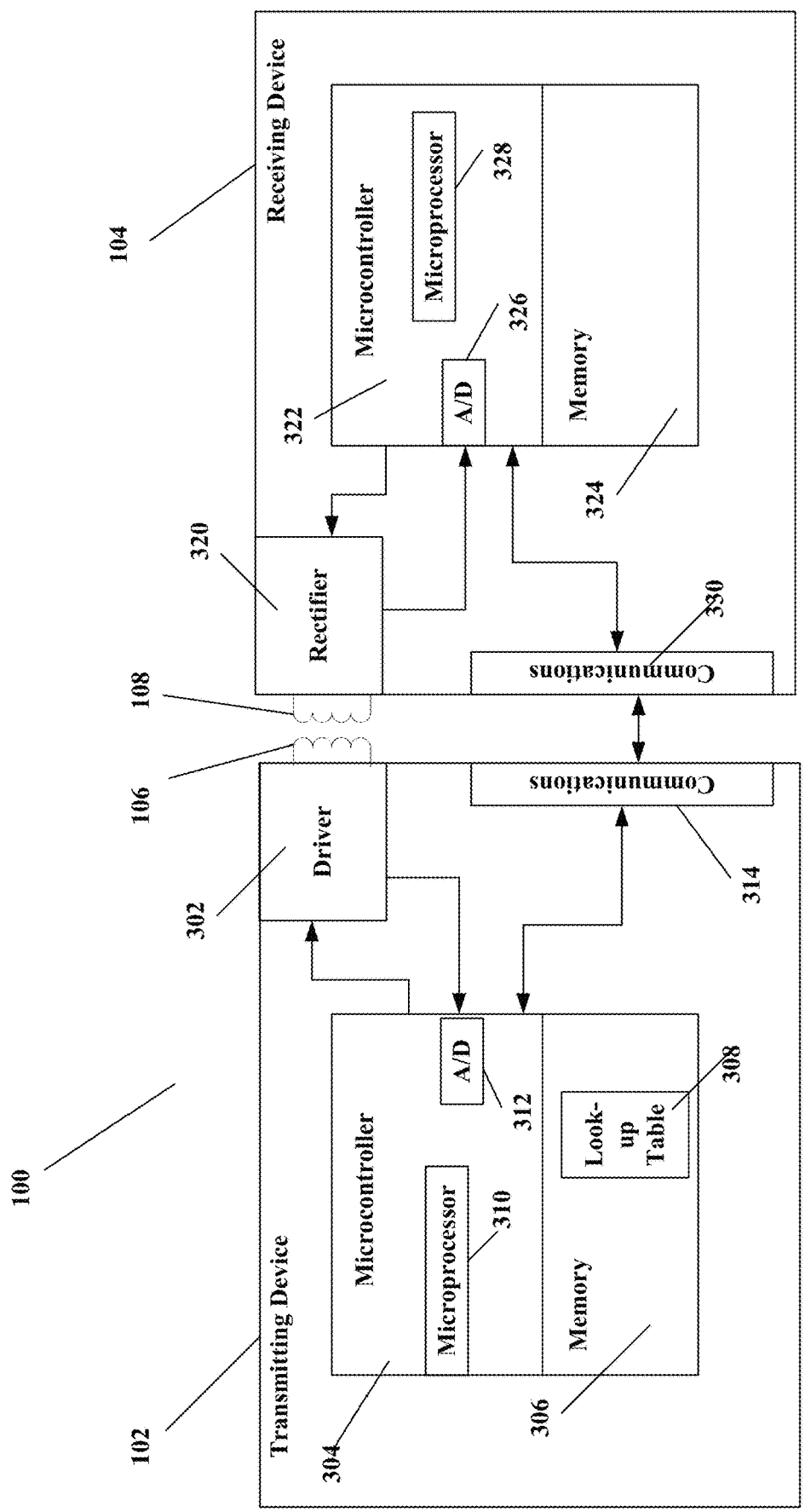
FIG. 3 illustrates a more detailed illustration of wireless power system 100 that includes various components for an adaptive control mechanism to operate the system within a target operating frequency, according to some embodiments.

FIG. 3 illustrates a more detailed illustration of wireless power system 100 that includes various components for an adaptive control mechanism to operate the system within a target operating frequency, according to some embodiments. As illustrated in FIG. 3, transmitting device 102 includes a microcontroller 304. Microcontroller 304 includes a microprocessor 310 coupled to a memory 306. Microprocessor 310 can be any microprocessor capable of operating algorithms as described below. Microcontroller 304 further includes a memory 306. Memory 306 includes both volatile and non-volatile memory that can store algorithm instructions executed by microprocessor 310 as well as data. Memory 306 further includes a look-up table 308, which stores characteristic parameters of transmitter coils and receiver coils, and the corresponding best operating frequency for a certain characteristic parameter, or a certain combination of characteristic parameters. Example characteristic parameters for the coils include but not limited to coil material, coil type, length, space gap, the allowable frequency range, loading condition, and/or the like.

To obtain the best operating frequency for a given receiver coil 108 and transmitter coil 106, as well as the space gap between coils 106 and 108, the lookup table 308 can be created by measuring the frequency that provides the best efficiency for a variety of receiver coil 108 and transmitter coil 106. In this way, the microcontroller 304 can determine the target operating frequency by querying the lookup table 308 in the memory 306 based on characteristic parameters of the transmitter coil 106 and/or receiver coil 108.

Microcontroller 304 is coupled to a driver 302, which is coupled to drive an AC current at a particular current level and frequency through transmitter coil 106. Additionally, microcontroller 304 may include analog-to-digital (A/D) converters 312 that receives from driver 302 signals indicative of voltages and currents through transmit coil 106. Microcontroller 304 is further coupled to a communications interface 314, which communicates with receiving device 104. Communications interface 314 may be any communications interface, including an in-band communications channel through driver 302.

A power supply that can provide adequate output voltage range and resolution (20 mV, for example) to power up the transmitting device 102 and any means to communication with microcontroller 304 is used. For example, the power supply can be either an adaptor outside the transmitting device 102 or a buck converter that is inside the transmitting device 102. The microcontroller 304 can control the power supply to generate an input voltage which in turn adjusts the operating frequency of the transmitting coil.

Receiving device 104 includes a rectifier 320 that receives and rectifies wireless power received a receive coil 108 and provides output voltages. Rectifier 320 is coupled to receive control signals from microcontroller 322. Further, currents through receiver coil 108 and voltages in rectifier 320 may be received into microcontroller 322 through A/D converter 326. Similarly, with microcontroller 304, microcontroller 322 includes a microprocessor 328 and memory 324. Microprocessor 328 can be any microprocessor capable of operating instructions that execute the algorithms described here. Memory 324 can be any combination of volatile and non-volatile memory that holds programming instructions executable by microprocessor 328 as well as operating data.

Figure 4:
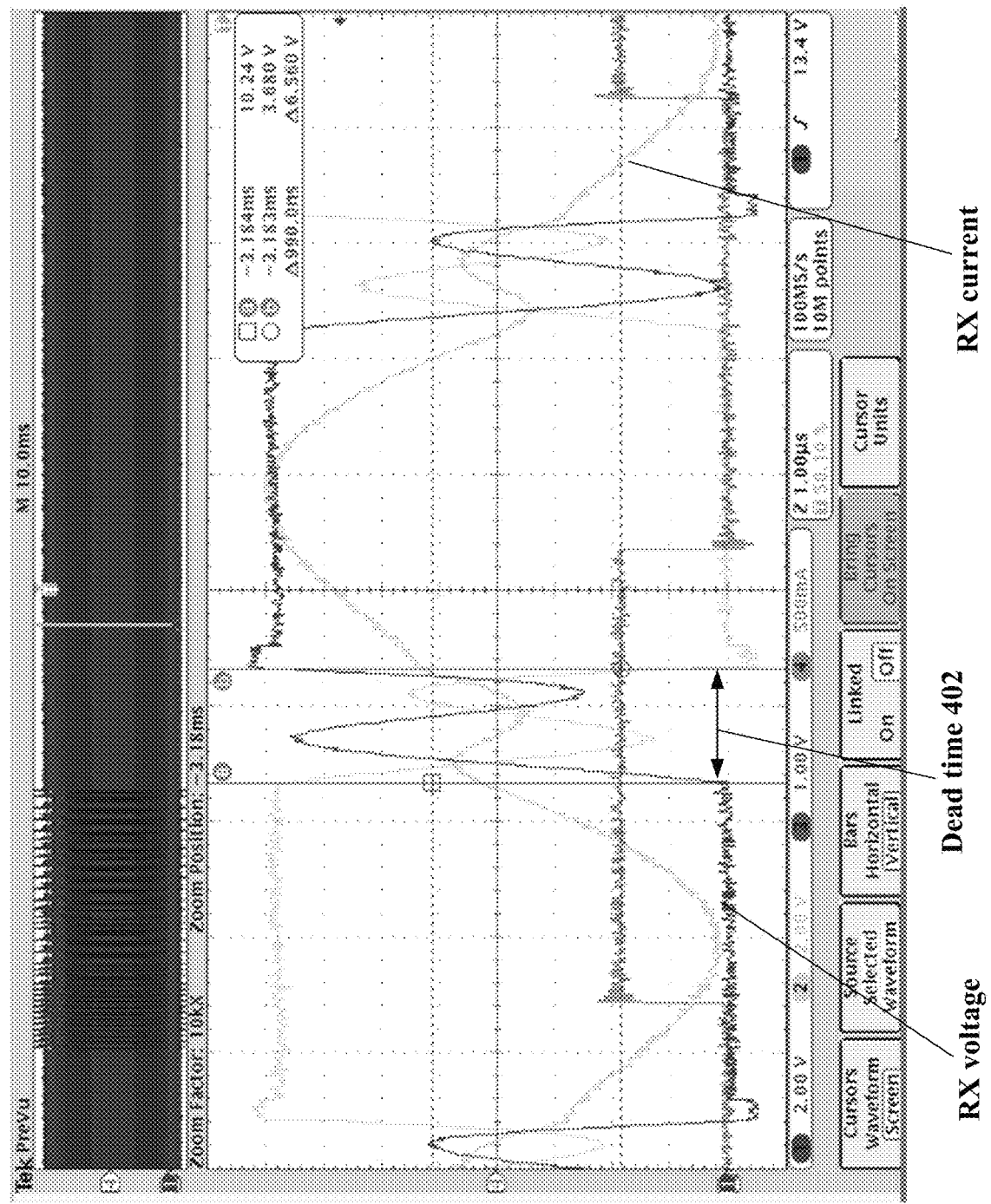
FIG. 4 shows the deadtime at the rectifier circuit at receiving device, during which signal oscillations may happen in the AC voltage/current at the rectifier circuit of the receiving device.

Similar to communication interface 314, receiving device 104 includes a communication interface 330. The communication interfaces 314 and 330 are configured to establish a communication link between the transmitting device 102 and receiving device 104. For example, microcontroller 322 is configured to measure deadtime of the AC voltage at the rectifier 320, e.g., via hardware means at the rectifier 320, or a soft-ware (SW) or firm-ware (FW) implementation such as a look up table stored at memory 324. FIG. 4 shows the deadtime at the rectifier circuit 320 at receiving device 104, during which signal oscillations may happen in the AC voltage/current at the rectifier circuit 320 of the receiving device 104.

Microcontroller 322 then sends packets including the deadtime information, through the communication interface 330, to transmitting device 102. Microcontroller 304 is then configured to determine whether operating frequency has drifted away from the optimal operating frequency, e.g., based on the deadtime feedback received at communication interface 314. For example, when the operating frequency is below the maximum operating frequency and the dead time is greater than a preset value (e.g., deadtime too long and thus allowing significant signal oscillation during deadtime that wastes power), then the wireless power system does not operate at the best efficiency mode.

If the operating frequency drifts away from the best efficiency operating frequency from the lookup table or the dead time method, microcontroller 304 can then adjust the input voltage of the transmit coil 106 in driver 302 to move the operating frequency back to the best efficiency range (133 KHz+/−5 kHz, for the example shown in FIGS. 2A-2C).

Figure 5:
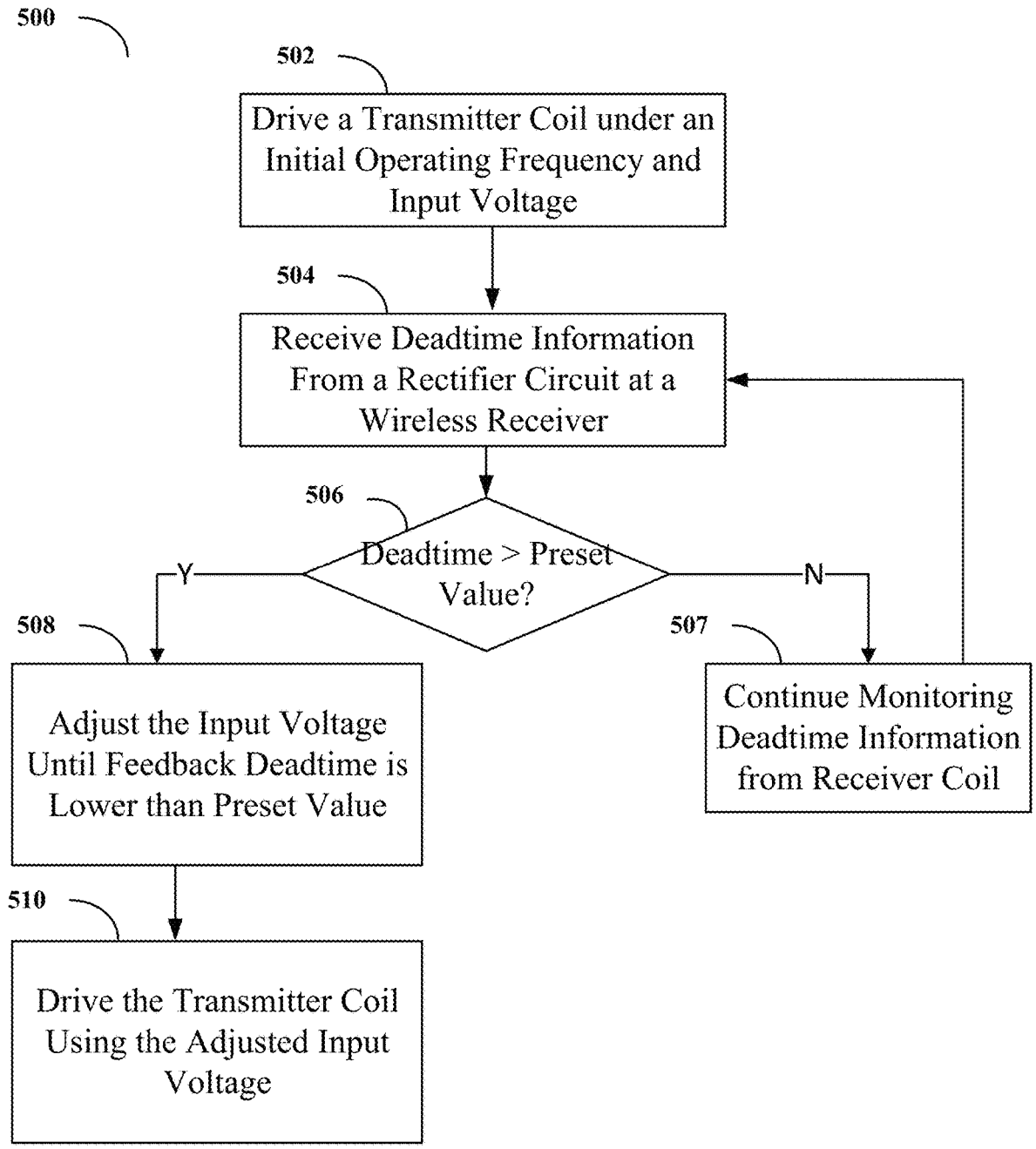
FIG. 5 illustrates an example logic flow diagram showing an adaptive process for efficiency mode control of the wireless power transfer system in FIG. 4, according to some embodiments described herein.

FIG. 5 illustrates an example logic flow diagram showing an adaptive process 500 for efficiency mode control of the wireless power transfer system 100 in FIG. 4, according to some embodiments described herein. At step 502, the transmitter coil (e.g., 106) is driven under an initial operating frequency and input voltage. In some embodiments, the initial operating frequency may be set as the target operating frequency by querying the lookup table 308 based on a characteristic parameter of the transmitter coil or the receiver coil. In some embodiments, even if the initial operating frequency is not set as the target operating frequency, the operating frequency may be adjusted to the target operating frequency range by the adaptive process including steps 504-508. At step 504, deadtime information is received from the rectifier circuit (e.g., 320) at the receiver (e.g., 104). At step 506, when the deadtime is determined to be greater than a preset value, process 500 moves to step 508, at which the input voltage to the transmitter coil is adjusted until the deadtime at the receiver rectifier is lower than the preset value. At step 510, the transmitter coil is driven using the adjusted input voltage. Or alternatively, when the deadtime is determined to be no greater than the preset value at step 506, process 500 proceeds to step 507, at which the deadtime information is continuously, intermittently or periodically monitored. Process 500 then repeats at step 504 from step 507.

Figure 6:
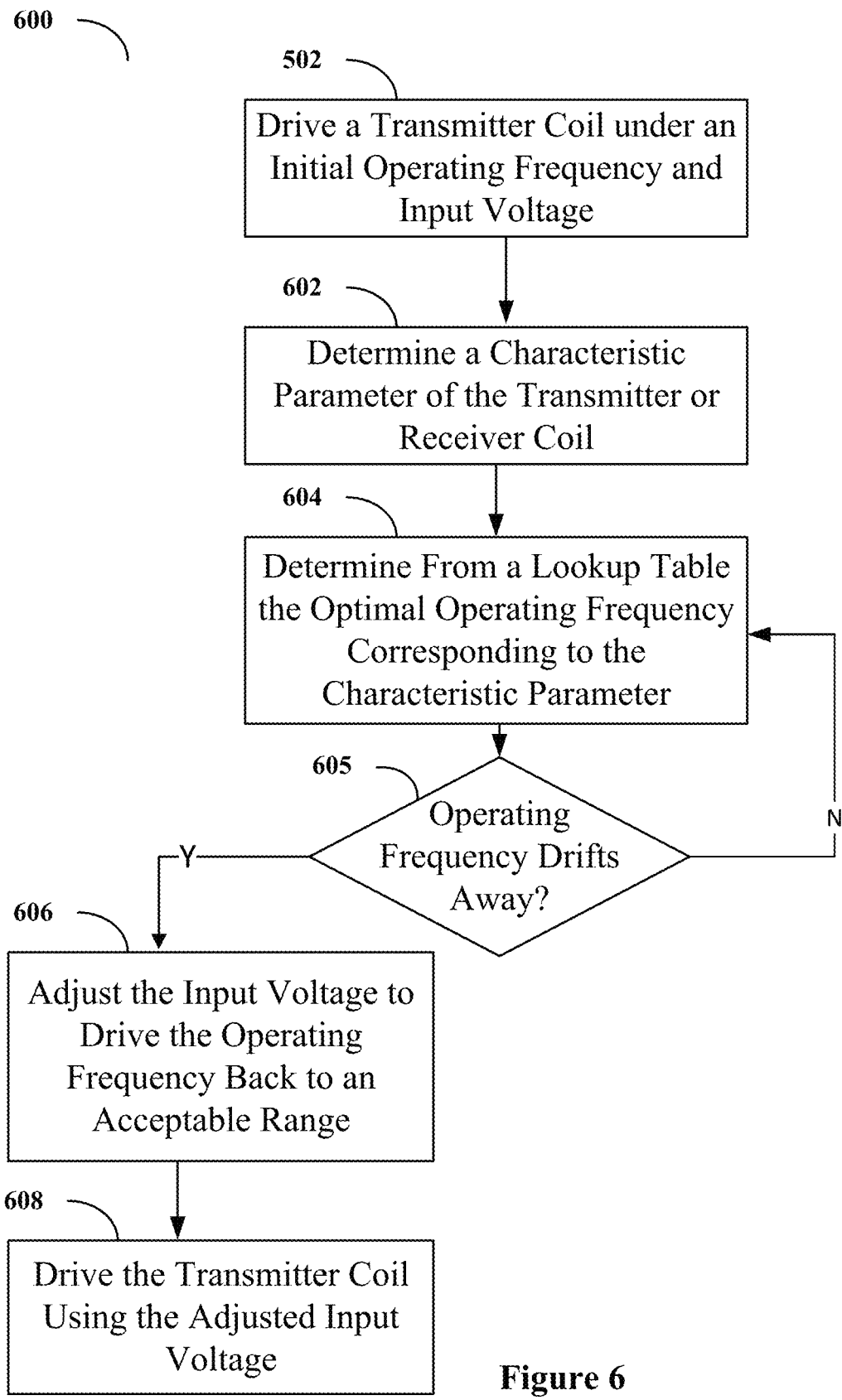
FIG. 6 illustrates an example logic flow diagram showing a process for efficiency mode control of the wireless power transfer system in FIG. 4, according to some embodiments described herein.

FIG. 6 illustrates an example logic flow diagram showing a process 600 for efficiency mode control of the wireless power transfer system 100 in FIG. 4, according to some embodiments described herein. Continuing on with 502, at step 602, a characteristic parameter of the transmitter coil or the receiver coil may be determined. At step 604, based on the characteristic parameter, the optimal or target operating frequency is determined from the lookup table (e.g., 308 in FIG. 3). At step 605, the microcontroller at the transmitting device may determine whether the operating frequency has drifted away, e.g., by comparing the current operating frequency with the target operating frequency retrieved from the lookup table. When the actual operating frequency is outside an acceptable range (e.g., ±5 KHz) of the target operating frequency, process 600 proceeds to step 606, where the input voltage is adjusted to drive the operating frequency back to the acceptable range. At step 608, the transmitter coil is then driven by the adjusted input voltage. Alternatively, if the operating frequency is not outside the acceptable range at step 605, process 600 proceeds to step 604 to periodically, intermittently or periodically determine whether the actual operating frequency drifts away from the optimal operating frequency.

To manage best load and line transient response, large frequency deviations are initially allowed and then slowly adjusted in transmitter input voltage to driver 302 to move the operating frequency back to its target value. For a transmitter input voltage supply with limited resolution (For example, 200 mV/step), large frequency deviation is allowed within the voltage step range and then the transmitter input voltage is adjusted to move the operating frequency back to its target value. This may result in relatively large frequency variation range (+/−10 kHz, for example).

Processes 500 and 600 may be implemented separately, concurrently, or interchangeably. For example, the lookup table based on process 600 may be used to set the initial operating frequency and input voltage, and the adaptive deadtime measurement based control mechanism in process 500 may be used to constantly adjust the input voltage to maintain the operating frequency within the target frequency range. Process 500 and 600 can be implemented by hardware, software, firmware, or a combination of any of the above at the transmitting device 102.

The above detailed description is provided to illustrate specific embodiments of the present invention and is not intended to be limiting. Numerous variations and modifications within the scope of the present invention are possible. The present invention is set forth in the following claims.

What is claimed is:

1. A method for controlling operating frequency for a wireless power charging system, comprising:
   driving a transmitter coil at a wireless power transmitter under an operating frequency and an input voltage by:
      determining a characteristic parameter of the transmitter coil or a receiver coil,
      retrieving, from a lookup table, a target operating frequency corresponding to the characteristic parameter,
      wherein the target operating frequency is previously determined, from a set of operating frequencies, that achieves a lowest root mean square value of currents and voltages at the wireless power transmitter under a same wireless power receiver output power, and configuring the operating frequency as the target operating frequency;

receiving, from a wireless power receiver having the receiver coil that receives wireless power from the transmitter coil, deadtime information at the wireless power receiver;

determining, based on the received deadtime information or the operating frequency, whether the operating frequency deviates from a target operating frequency range; and adjusting one or both of the operating frequency or the input voltage thereby causing the operating frequency to fall within the target operating frequency range.

2. The method of claim 1, further comprising:
obtaining the input voltage from a power supply that provides a voltage range with an adjustment resolution.

3. The method of claim 1, wherein the receiving, from the wireless power receiver having the receiver coil that receives wireless power from the transmitter coil, deadtime information at the wireless power receiver comprises:
establishing, via a transmitter communication interface at the wireless power transmitter, a communication connection with a receiver communication interface at the wireless power receiver; and
receiving, via the communication connection, one or more packets containing the deadtime information.

4. The method of claim 1, wherein the determining, based on the received deadtime information or the operating frequency, whether the operating frequency deviates from the target operating frequency range comprises:
retrieving the target operating frequency from the lookup table stored at a memory of the wireless power transmitter; and
determining whether the operating frequency falls within a range around the target operating frequency.

5. The method of claim 1, wherein the determining, based on the received deadtime information or the operating frequency, whether the operating frequency deviates from the target operating frequency range comprises:
obtaining, from the received deadtime information, a deadtime at a rectifier circuit of the wireless power receiver;
determining whether the deadtime is greater than a preset value;
determining that the operating frequency deviates from the target operating frequency range when the operating frequency is less than a maximum operating frequency and the deadtime is greater than the preset value.

6. The method of claim 5, wherein the adjusting one or both of the operating frequency or the input voltage thereby causing the operating frequency to fall within the target operating frequency range comprises:
adaptively adjusting the input voltage at an adjustment resolution until the deadtime decreases to be lower than the preset value.

7. A device for controlling operating frequency for a wireless power charging system, comprising:
a memory configured to store a lookup table that stores a characteristic parameter of a transmitter coil or a receiver coil, and a target operating frequency corresponding to the characteristic parameter, wherein the target operating frequency is previously determined, from a set of operating frequencies, that achieves a lowest root mean square value of currents and voltages at a wireless power transmitter under a same wireless power receiver output power;
the transmitter coil driven under an operating frequency and an input voltage;
a communication interface configured to receive, from a wireless power receiver having the receiver coil that receives wireless power from the transmitter coil, deadtime information at the wireless power receiver; and
a controller configured to:
determine, based on the received deadtime information or the operating frequency, whether the operating frequency deviates from a target operating frequency range; and
adjust one or both of the operating frequency or the input voltage thereby causing the operating frequency to fall within the target operating frequency range.

8. The device of claim 7, further comprising:
a power supply buck converter configured to feed the input voltage to the transmitter coil,
wherein the power supply is configured to provide a voltage range with an adjustment resolution.

9. The device of claim 7, wherein the input voltage is received from an adaptor outside the device.

10. The device of claim 7, wherein the controller is further configured to:
determine the characteristic parameter of the transmitter coil or the receiver coil;
retrieving, from the lookup table, the target operating frequency corresponding to the characteristic parameter; and
configure the operating frequency as the target operating frequency.

11. The device of claim 7, wherein the communication interface is configured to receive, from the wireless power receiver having the receiver coil that receives wireless power from the transmitter coil, deadtime information at the wireless power receiver by:
establishing, via a transmitter communication interface at the wireless power transmitter, a communication connection with a receiver communication interface at the wireless power receiver; and
receiving, via the communication connection, one or more packets containing the deadtime information.

12. The device of claim 7, wherein the controller is further configured to determine, based on the received deadtime information or the operating frequency, whether the operating frequency deviates from the target operating frequency range comprises:
retrieving the target operating frequency from the lookup table stored at the memory of the wireless power transmitter; and
determining whether the operating frequency falls within a range around the target operating frequency.

13. The device of claim 7, wherein the controller is further configured to determine, based on the received deadtime information or the operating frequency, whether the operating frequency deviates from the target operating frequency range by:
obtaining, from the received deadtime information, a deadtime at a rectifier circuit of the wireless power receiver;
determining whether the deadtime is greater than a preset value;
determining that the operating frequency deviates from the target operating frequency range when the operating frequency is less than a maximum operating frequency and the deadtime is greater than the preset value.

14. The device of claim 13, wherein the controller is further configured to adjust one or both of the operating frequency or the input voltage thereby causing the operating frequency to fall within the target operating frequency range by:
adaptively adjusting the input voltage at an adjustment resolution until the deadtime decreases to be lower than the preset value.

15. A system for controlling operating frequency for a wireless power charging system, comprising:
means for driving a transmitter coil at a wireless power transmitter under an operating frequency and an input voltage by:
determining a characteristic parameter of the transmitter coil or a receiver coil,
retrieving, from a lookup table, a target operating frequency corresponding to the characteristic parameter,
wherein the target operating frequency is previously determined, from a set of operating frequencies, that achieves a lowest root mean square value of currents and voltages at the wireless power transmitter under a same wireless power receiver output power, and
configuring the operating frequency as the target operating frequency;
means for receiving, from a wireless power receiver having the receiver coil that receives wireless power from the transmitter coil, deadtime information at the wireless power receiver;
means for determining, based on the received deadtime information or the operating frequency, whether the operating frequency deviates from a target operating frequency range; and
means for adjusting one or both of the operating frequency or the input voltage thereby causing the operating frequency to fall within the target operating frequency range.

16. The system of claim 15, wherein the means for receiving, from the wireless power receiver having the receiver coil that receives wireless power from the transmitter coil, deadtime information at the wireless power receiver comprises:
means for establishing, via a transmitter communication interface at the wireless power transmitter, a communication connection with a receiver communication interface at the wireless power receiver; and
means for receiving, via the communication connection, one or more packets containing the deadtime information.

17. The system of claim 15, wherein the means for determining, based on the received deadtime information or the operating frequency, whether the operating frequency deviates from the target operating frequency range comprises:
means for retrieving the target operating frequency from the lookup table stored at a memory of the wireless power transmitter; and
means for determining whether the operating frequency falls within a range around the target operating frequency.

18. The system of claim 17 wherein the means for determining, based on the received deadtime information or the operating frequency, whether the operating frequency deviates from the target operating frequency range comprises:
means for obtaining, from the received deadtime information, a deadtime at a rectifier circuit of the wireless power receiver;
means for determining whether the deadtime is greater than a preset value;
means for determining that the operating frequency deviates from the target operating frequency range when the operating frequency is less than a maximum operating frequency and the deadtime is greater than the preset value.

* * * * *